May 19, 1942.  J. M. KREININ  2,283,268
APPARATUS FOR PROJECTING IMAGES OF TRANSPARENT OR OPAQUE OBJECTS
AND SCRIPT ON A SCREEN
Filed May 22, 1939
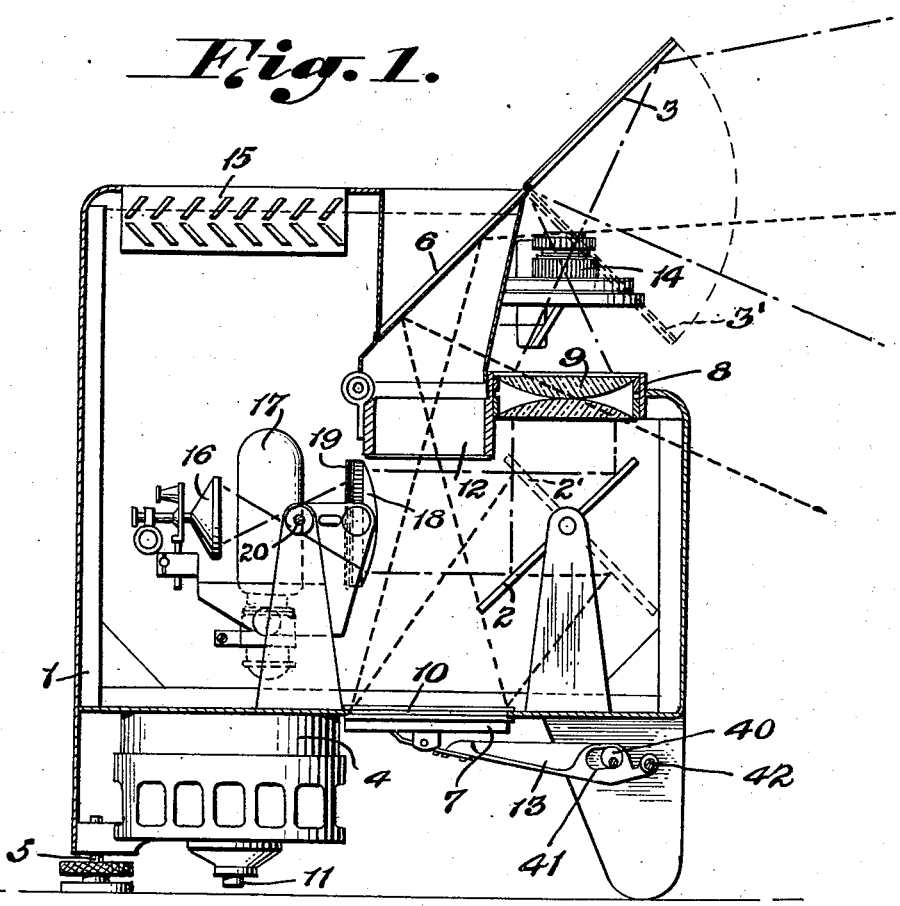
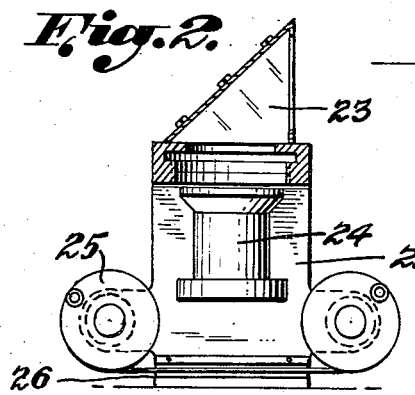
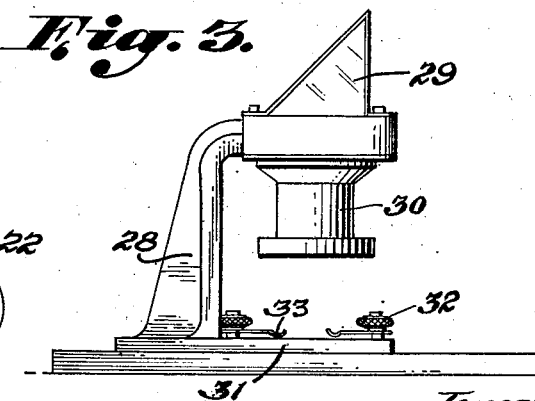
Inventor,
J. Kreinin Patented May 19, 1942

2,283,268

UNITED STATES PATENT OFFICE 2,283,268

APPARATUS FOR PROJECTING IMAGES OF TRANSPARENT OR OPAQUE OBJECTS AND SCRIPT ON A SCREEN

Jacob Marcovich Kreinin, Moscow, Union of Soviet Socialist Republics

Application May 22, 1939, Serial No. 275,084. In the Union of Soviet Socialist Republics February 3, 1939

6 Claims. (Cl. 88—24)

Apparatuses are known for projecting images of transparent or opaque objects, microscopic slides, script on a screen. These apparatuses have two lenses, movable source of illumination, mirrors, object tables for opaque objects and a frame for transparencies, enabling various methods of projecting an image on a screen to be obtained.

The proposed apparatus differs from previously known in that it uses only one rotatable mirror which enables the operator to either direct the rays of light onto the opaque object for projection by reflected light or through a transparency for direct projection.

In the drawing, Fig. 1 shows the first mentioned form of the proposed apparatus, Fig. 2 shows an accessory for projecting ordinary and cinematographic films and Fig. 3 shows another accessory for projecting microscope slides.

The apparatus shown in Fig. 1 of the drawing comprises a casing 1 in which there is a movable mirror 2 fastened to a special support. The mirror 2 when in position shown in full lines serves to direct the rays of light from the lamp assembly 16—21 through condenser 9 and lens 14 onto mirror 3 which reflects them onto the screen. When the mirror 2 is in the position marked 2¹ it serves to direct the rays of light onto an opaque object placed on object table 7 so that the light reflected from it is projected by lens 12 and mirror 6 onto the screen. Mirror 3 is attached to mirror 6 by a hinge and when the apparatus is not being used, mirror 3 is lowered to position 3¹ when it closes the apparatus.

The housing of lens 14 is pivoted so that when mirror 3 is lowered to position 3¹, it can be turned aside. A lever 13 is supplied for pressing the object table 7 against the frame opening 10.

Lens 14 may be furnished with a reflecting prism to take place of mirror 3.

The lamp assembly installed inside the body of the apparatus consists of a filament or high-pressure vapour electric lamp 17, a reflector mirror 16, a heat absorbing filter 19 and a condenser 18. The whole assembly can be turned about a pivot 20 so as to directly illuminate an opaque object placed on table 7. An electric fan 11 is mounted in the base of the box by means of a casing 4 having hole for admitting cooling air, while at the top of the box there are slots 15 for the heated air to escape through. The ventilator fan can also be installed in the top of the lantern casing with the slots for admitting cold air at the bottom.

For projecting ordinary and cinematographical films an accessory illustrated in Fig. 2 is supplied. It consists of a bracket 22 a prism 23 with a silvered reflecting hypotenuse replacing mirror 3, a lens 24 of short focal length, drums 25 for holding the film, a frame 26 and condenser lens not shown in the drawing.

Apart from this accessory there is another illustrated in Fig. 3 for projecting microscope slides. It consists of a bracket 28, prism 29, special lens 30, frame window 31 and press-springs 33 with nuts 32 for holding the slide.

The proposed apparatus is used in the following manner. For projecting drawings, plans, books, drawings, etc., by reflected light, the objects to be projected on the screen are placed on object table 7 and by means of lever 13 are pressed against the frame opening 10. Mirror 2 is turned to the position 2¹ shown in dotted lines in the drawing. When projecting three-dimensioned models, globes etc., table 7 can be lowered quite sufficiently, but if necessary, it can be turned away so as not to interfere with the object being projected. The adjustment of the table is effected by a rotatable eccentric 40 engaging in a slot 41 in the lever 13 adjacent the pivotal support 42 therefor.

The lamp assembly is not moved, the rays of light being reflected from mirror 2 in the position 2¹ onto the object and then by means of lens 12 and mirror 6 are projected onto a screen. Lens 14 is moved aside so as not to obscure the mirror 6. It is possible to turn the lamp assembly on pivot 20 to illuminate the object directly, without using mirror 2. For projecting transparencies the beam of light from the lamp 7 is reflected by the concave mirror 16 and passing through the heat absorbing filter 19 and condenser 18 is reflected by mirror 2 disposed in the full line position onto condenser 9. This condenser may consist of one or two lenses depending upon the focal length of the lens 14. The slide holder is situated below lens 14.

The beam of light passes through condenser 9 and lens 14 and after reflection at mirror 3 is projected onto a screen.

For projecting writing, etc., a ground glass or a transparent Cellophane strip on which the writing is made by a special pencil, is placed in the frame 8 situated above condenser 9, while the lamp assembly and mirror 2 are in the position used for projecting transparencies.

For projecting ordinary or cinematographic films the accessory according to Fig. 2 is placed on frame 8 while lens 14 is moved to one side, and finally for projecting microscope slides, the accessory according to Fig. 3 or an ordinary microscope and condenser is placed on frame 8.

For convenience in operation the apparatus may be furnished with means not shown in the drawing for controlling the light source, for turning the mirror and lenses, these means being operated from the switch board.

I claim:

1. An apparatus for projecting images of transparencies, opaque objects, pictures and the like on a screen comprising two lenses arranged side by side, mirror means angularly related to said lenses for reflecting images projected by said lenses onto a screen, a single lighting unit consisting of a lamp and a condenser, a second condenser arranged in front of one of said lenses, a horizontal table disposed beneath the other lens for supporting opaque objects and pictures, and a second reflector movable into positions to reflect the light passing through the first condenser either upon the table or the second condenser.

2. An apparatus for projecting images of transparencies, opaque objects, pictures and the like, two lenses arranged side by side and reflecting prisms adjacent said lenses, and in operative relation therewith to reflect images projected by said lenses onto a screen, a single lighting unit, a holder for transparencies in front of one of said lenses, a table for supporting objects and pictures arranged beneath the other lens, and an adjustable reflector for directing the light from said lighting unit either upon the table or said holder.

3. An apparatus as claimed in claim 2, characterized in that said lighting unit includes a reflector, heat absorbing filter and condenser.

4. A device for use in connection with the apparatus claimed in claim 1, comprising a microscopic lens and a prism arranged adjacent said lens and means for holding microscopic slides adjacent the microscopic lens.

5. A device for use in conjunction with the apparatus defined in claim 1, comprising a lens of short focal length, a reflector prism arranged adjacent said lens and means for supporting motion picture film adjacent said lens.

6. An apparatus as claimed in claim 1 characterized by the provision of a casing enclosing the lighting unit and the second reflector and means for cooling said chamber.

JACOB MARCOVICH KREININ.